United States Patent [19]

Waldstein

[11] 4,062,957

[45] * Dec. 13, 1977

[54] BACTERICIDAL AND FUNGICIDAL 1,3,5 TRIALKANOL TRIAZINES

[76] Inventor: David A. Waldstein, 622 Bergen Ave., Jersey City, N.J. 07607

[*] Notice: The portion of the term of this patent subsequent to Sept. 21, 1993, has been disclaimed.

[21] Appl. No.: 698,935

[22] Filed: June 23, 1976

Related U.S. Application Data

[62] Division of Ser. No. 449,368, March 8, 1974, Pat. No. 3,981,998.

[51] Int. Cl.$^2$ ............................................. A01N 9/22
[52] U.S. Cl. .................................... 424/249; 544/215
[58] Field of Search ................... 424/249; 260/248 NS

[56] References Cited

U.S. PATENT DOCUMENTS 3,981,998  9/1976  Waldstein ............................ 424/249

OTHER PUBLICATIONS

Chemical Abstracts 72: 112250z (1970).

Primary Examiner—Leonard Schenkman
Attorney, Agent, or Firm—Kirschstein, Kirschstein, Ottinger & Frank

[57] ABSTRACT

A novel composition constituting a mixture of 1, 3, 5-tri (variegated alkanols) hexahydro-s-triazines and 1, 3, 5 trialkanol hexahydro-s-triazines, where the alkanol moieties have from 1 to 4 carbon atoms. The composition is made by reacting a mixture of monoalkanolamines, preferably in substantially equal gram-molecular proportions, with paraformaldehyde and stripping off the water formed by the reaction. The composition is used by adding a bactericidally or fungicidally effective amount thereof to a carrier which is to be protected against the activity of bacteria or fungi or which is to be applied to a substrate to be so protected. The carrier may be a solid medium, such as solid soap or a liquid medium such as liquid soap, water or an organic liquid, e.g., a liquid alcohol or a liquid hydrocarbon. Typical carriers are cutting oil, hydraulic fluid, varnish, shellac, water- and oil-based paints, methanol, ethanol and propanol, liquid adhesives, cleaners and disinfectants.

5 Claims, No Drawings

BACTERICIDAL AND FUNGICIDAL 1,3,5 TRIALKANOL TRIAZINES

This is a division of application Ser. No. 449,368 filed Mar. 8, 1974 now U.S. Pat. No. 3,981,998

BACKGROUND OF THE INVENTION

1. Field of the Invention

Mixed variegated alkanol and alkanol triazines, the manufacture thereof and bactericidal and fungicidal compositions containing the same.

2. Description of the Prior Art

There are presently available a large number of compounds that have been proposed and have been used for their bactericidal and/or fungicidal action. Their field of use is extremely wide. Bactericides and/or fungicides have been incorporated in a multitude of compositions of matter primarily for three purposes, the first being to prevent deterioration of the composition due to bacterial/fungal attack between the time that the composition is made and the time that the composition is used, the second being to inhibit bacterial attack on the composition after the composition has been applied to an object, and the third being to inhibit bacterial attack of an object to which the composition is applied.

Typical of the first use are cutting oils, grinding oils, penetrating oils, drawing oils, iron tinning oils, core oils, and hydraulic oils. These are known to be subject to bacterial and/or fungal attack which degrades the physical characteristics and efficiency of the oils. The different kinds of bacteria and fungi and the nature of their attack on these oils are so well known and so thoroughly documented that it is unnecessary to iterate such state of the art in this application. Typical patents which deal with the action of bacteria on various industrial oils and the use of bactericides and/or fungicides therein are U.S. Letter Pat. Nos. 2,976,244; 2,987,479; 3,013,973 and 3,033,785.

Typical of the second use are paints, for example, water-base emulsion paints such as acrylic paints, vinyl paints, rubber latex paints and alkyd paints, and oil-base paints such, for example, as linseed oil paint and also varnishes, adhesives and paper coatings.

Typical of the third use are household disinfectants, liquid soaps and solid soaps, e.g. bar soap, soap beads and soap flakes.

The problems with different bactericides and fungicides are many. For example, some are too expensive for widespread commercial use, some are toxic or create nausea or alimentary irritation if ingested and therefore are considered unsafe for general purpose use in households where children may be present, some are irritating to the skin both when applied to the skin in the compositions of matter in which they are incorporated or when touched by a person after the composition has been applied to an object and is present only in a residue, some have an initial good bacteriostatic and/or fungicidal efficiency but tend to become less effective over a period of time due either to the acquisition of a tolerance by different strains and types of bacteria and/or fungi or to the development of a variant strain which all flourish upon the suppression of other types of strains of bacteria and/or fungi, some have a low degree of efficiency and must be used in unduly high concentrations, some have a rather restricted action spectrum, and others have too slow a speed of action.

Among the large number of bactericides and/or fungicides available, and which are so well known to the art that they will not be repeated here, is one compound which has been proposed as a bactericide and which is believed to be the compound chemically closest to the bactericide/fungicide of the present invention. This is 1,3,5-tri (β-hydroxy) ethylhexahydro-s-triazine. However, 1,3,5-tri (β-hydroxy) ethylhexahydro-s-triazine is subject to many of the aforementioned defects. Thus, it does not have a desirably wide spectrum of bacteriostatic action, its bacteriostatic action deteriorates over extended periods of time due, it is thought, to either the aforementioned tolerance or the development of variant strains of bacteria, it does not have a highly rapid bacteriostatic rate and it has caused outbreaks of dermatitis. Neither it nor other 1,3,5-tri (lower [Cl to 4] alknaol) hexahydro-s-triazines are effective fungicides.

SUMMARY OF THE INVENTION

1. Purposes of the Invention

It is an object of this invention to provide a novel mixture of 1,3,5-tri (variegated alkanols) hexahydro-s-triazines and 1,3,5- trialkanol hexahydro-s-triazines and method of making the same.

It is another object of the invention to provide a novel bactericide/fungicide which is not subject of the enumerated and other defects of the prior art.

It is another object of the invention to provide a composition embodying the aforesaid novel bactericide/fungicide composition and which includes said bactericide/fungicide in a bacterial/fungal-inhibiting amount in a carrier, the carrier optionally having a function other than that simply of a diluent or carrier for the bactericide/fungicide, that is to say, optionally serving some major functional purpose other than a bacteriostatic and/or fungicidal one.

It is another object of the invention to provide a novel bactericide/fungicide which is inexpensive to make, which is easy to incorporate in a carrier, which is non-toxic either upon application to the skin or upon ingestion and, even upon ingestion, will not create nausea or alimentary irritation, which is non-irritating to the skin and will not induce dermatitis, which has an excellent, quick and enduring bacteriostatic/fungicidal action, which is effective in low concentrations, and which has a broad action spectrum.

Other objects of the invention in part will be obvious and in part will be pointed out hereinafter.

2. Brief Description of the Invention

The present invention resides in a specific limited class of compounds, particularly a mixture of 1,3,5-tri (variegated alkanols) hexahydro-s-triazines and 1,3,5-trialkanol hexahydro-s-triazines. These have the formula mixture of 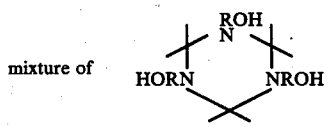

where R is an alkyl having from 1 to 4 carbon atoms, where at least two different R's are present in the mixture, and where the different R's are present in the various triazines of the mixture in a statistically random fashion.

The mixture is a reaction produce of at least two different monoalkanolamines having 1 to 4 carbon atoms with paraformaldehyde which usually contains some water, the water which is the product of the reaction and the water initially present being stripped off. In the preferred form of the invention the monoalkanolamines are monoethanolamine and 1-isopropanolamine which are present at the beginning of the reaction in equimolar proportions; however the invention includes within its scope the presence at the beginning of the reaction of/from as little as 5% by weight of monoethanolamine, the balance of the alkanolamines being 1-isopropanolamine to as much as 95% by weight of monoethanolamine, the balance being 1-isopropanolamine. The invention embraces the use of more than two monoalkanolamines in the reaction and, indeed as many different monoalkanolamines as are desired can be present at the beginning of the reaction with the paraformaldehyde, the minimum useful amount of any given monoalkanolamine being 5% by weight of the total weight of alkanolamines. For the purpose of efficient utilization of the starting materials the monoalkanolamines and the paraformaldehyde are in stoichiometric balance; however, an excess of either will not affect the reaction, but it desirably should be removed. A desired range for the ratio of monoalkanolamines when two are employed is from one-half to two gram mols of either to two to one-half gram mols of the other.

The reaction conditions are not critical. Initially no heat need be supplied since the reaction is exothermic; indeed cooling may be practised to prevent destructive heating. The water produced by the reaction is stripped off, as by carrying on the reaction, after completing the addition of the reactants in the open air and mixing the same for homogeniety, under a vacuum in a closed retort to which a cooled receiver is connected to collect water. Subsequently the temperature is raised still further to remove substantially all the water created. The water also can be removed by solvent extraction, e.g. with xylene or toluene. The reaction is carried out to completion.

The temperature, times and pressures employed do not affect the end result; but the conditions indicated desirably are observed to complete the reaction within a reasonable time and to obtain a maximum yield.

The end product of the reaction is a mixture of 1,3,5 hexahydro-s-triazines in which the N atoms have the different alkanols bonded thereto in a statistically random fashion, that is to say, if for example two monoalkanolamines are present in equimolar amounts, approximately, one-eighth of the mixed triazines will have three of one of the alkanols bonded to its N atoms, another one-eighth of the mixed triazines will have three of the other alkanol bonded to its N atoms and the balance of the triazines will have one of the alkanols bonded to one or two of the three N atoms of each triazine and the other alkanol bonded to the remaining N atoms of each triazine. If the monoalkanolamines are present in non equimolar amounts the distribution pattern of the alkanols on the N atoms of the triazines will favor the alkanol of the monoalkanolamine which is present in the larger amount. Similarly if three or more monoalkanolamines are employed the distribution pattern of the alkanols on the N atoms of the triazines will approximate the ratio of the alkanols in the starting monoalkanolamines.

The reaction produce is a heavy viscous liquid that is pale yellow in color. It has a flash point of about 235° F. It is highly soluble in water, indeed 95% water solutions thereof are prepared with no difficulty. The reaction product is also soluble in oils of all types, e.g. animal, mineral and vegetable. The novel triazine mixture is an excellent bactericide/fungicide and can be incorporated in all compositions in which the presence of a bactericide and/or fungicide is desirable, examples of such compositions being cutting oil, grinding oil, penetrating oil, drawing oil, iron tinning oil, core oil, hydraulic oil, latices, varnishes, adhesives, paper coatings, water, liquid soaps, solid soaps, cooling tower water, jet fuel, semi-synthetic fluids, synthetic fluids and water-base and oil-base paints.

The invention accordingly consists in compounds, compositions of matter employing the compounds, methods of using such compositions of matter and methods of making and using said compounds which are exemplified in the compounds, compositions and methods hereinafter described and of which the scope of application will be indicated in the appended claims.

DESCRIPTION OF THE PREFERRED EMBODIMENTS

To prepare the novel mixture of the present invention which is a mixture of 1,3,5-tri (variegated alkanols) hexhydro-s-triazines and 1,3,5-trialkanol hexahydro-s-triazines, two or more monoalkanolamines having from 1 to 4 carbon atoms are mixed at room temperature in a reactor having a reflux condensor connected to an external receiver. The reactor includes vacuum, heating and cooling means and is open to the ambient air during the mixing of the monoalkanolamines. The mixing is without heating or cooling and is carried on long enough to obtain a homogeneous mass. Then a stoichiometric amount of paraformaldehyde (one gram mol for each gram mol of each alkanolamine) is added slowly while the mixing continues. Preferably the temperature during the stage of adding the paraformaldehyde is kept between about 50° to 75° C. The temperature can be controlled at the foregoing stage by cooling the reacting mass or by maintaining the rate of addition of the paraformaldehyde sufficiently slow not to exceed the upper temperature limit, the reaction of the paraformaldehyde with monoalkanolamines to form triazines being exothermic. A typical time for the addition of all the paraformaldehyde is about 2 hours, with the paraformaldehyde being added at a uniform rate. The retort is kept open to the ambient air during the addition of the paraformaldehyde. After all the paraformaldehyde is in solution, the retort is closed and a vacuum is applied, typically in the order of 3–5 mm. of mercury. The temperature is maintained at about 75° C to 90° C until about one and one-half to about one and three-quarter gram moles of water are distilled off. This typically takes about three to four hours. Next the temperature is raised to about 100° to 110° C for about two hours, still under vacuum until a total of about two gram mols of water, including the previously removed water, plus the water initially present, is removed. The reaction is carried out to completion. The reaction product is coooled to room temperature and removed from the retort at atmospheric pressure. If any residual water is present, the paraformaldehyde usually includes about 10% by weight of water, it can be removed by solvent extraction, e.g. with toluene or xylol. Removal of water from the finished reaction product is not necessary; indeed for many uses the reaction product is added to water, just to form a concentrate and then further diluted to form a working product.

The monoalkanolamines of choice are monoethanolamine and 1-isopropanolamine, the same being employed in a range by weight of from one-half to twice of either to the other and, preferably, in equal gram-molecular amounts. Typical other monoalkanolamines that may be used pursuant to the present invention are monomethanolamine, mono-n-propanolamine, mono-n-butanolamine and mono-sec-butanolamine.

When the monoalkanolamines of choice are employed, in the preferred amounts, the reaction product, hereinafter the "preferred mixed reaction product", is a mixture of 1,3,5-triethanol hexhydro-s-triazine, 1,3,5-tripropanol hexahydro-s-triazine, 1,3,5-monoethanol bispropanol hexahydro-s-triazine and 1,3,5-bisethanol monopropanol hexahydro-s-triazine, with the ethanol and propanol moieties being statistically randomly distributed.

The mixed reaction products (starting with two or more monoalkanolamines) have been found to be useful as bactericides/fungicides (1) that have a wide spectrum of bactericide/fungicide action, (2) that can be made easily and inexpensively, (3) that can readily be incorporated in a composition of matter where they serve as bactericides/fungicides, (4) that are effective in low concentrations acting both against bacteria and fungi which would tend (a) to grow in the composition of matter (b) to deteriorate the composition of matter, (c) to attack an object to which the composition of matter is applied, and (d) to attack the composition of matter after application to the object drying or setting thereof, (5) that are non-toxic and non-irritating topically or within the alimentary canal and (6) that are quick, long-lasting and effective in their bacteriostatic/fungicidal action.

The mixed reaction products are characterized by their high degree of solubility in water and in oils of various types, e.g. animal, mineral and vegetable oils, as well as by their solubility in many organic solvents such, for example as ethanol, methanol, propanol, and aliphatic and aromatic solvents generally such, for example, as Shell Sol 71, manufactured by Shell Oil Company; Isopar H, Isopar K and Isopar L, manufactured by Humble Oil and Refining Company; Amsco OMS, Amsco 460 Solvent and Amsco Odorless Insecticide Base, manufactured by American Mineral Spirits Company; and odorless kerosene. Physical characteristics of Shell Sol 71, Isopar H, Isopar K, Isopar L, Amsco OMS, Amsco 460 Solvent and Amsco Odorless Insecticide Base which fingerprint these solvents are set forth below:

solvent, which will depend upon the process and/or the end product, and then added to the carrier as a manufacturing convenience. Conventional addenda also may and usually will be incorporated in the ensuing composition of matter as, for example, surfactants, rust inhibitors, cleansers, perfumes, masking agents, opacifying agents and coupling agents.

The novel bactericides/fungicides of the instant invention are effective upon a variety of bacteria and upon fungi. The following are typical of the types upon which said agents are useful as a bactericide or fungicide when present in a sufficient concentration as will be mentioned hereinafter:

Achromobacter sp.
Aerobacter sp.
   e.g. Aerobacter aerogenes
Alcaligenes sp.
Asperligus
Bacillus sp.
   e.g. Bacillus cereus
   Bacillus subtilis
Clostridium sp.
   e.g. Clostridium
Corynebacterium
Desulfovibrio sp.
Diplococcus sp.
   e.g. Diplococcus pneumoniae
Escherichia sp.
   e.g. Escherichia coli
   Escherichio freundii
Fusarium
Flavobacterium sp.
Klebsiella sp.
   e.g. Klebsiella pneumoniae
Mycobacterium
Nocardia sp.
Paracolobacterum sp.
Proteus sp.
   e.g. Proteus morganii
   Proteus vulgaris
Pseudomonas sp.
   e.g. Pseudomonas aeruginosa
   Pseudomonas oleovorans
Salmonella sp.
Sarcina sp.
Shigella sp.
Staphylococcus sp.
   e.g. Staphylococcus albus
   Staphylococcus aureus
   Staphylococcus citreus

|  | Distillation | | Flash Pt. | | | |
|---|---|---|---|---|---|---|
|  | IBP* °F. | Dry End Pt. °F. | °F. TCC | K.B. No. | Aniline Pt. °F. | Sp.Gr. 60°/60° F. |
| Shell Sol 71 | 345 | 398 | 121 | 26.5 | 183 | 0.7563 |
| Isopar H | 350 | 371 | 123 | 26.9 | 183 | 0.7571 |
| Isopar K | 349 | 383 | 126 | 26.5 | 185 | 0.7587 |
| Isopar L | 372 | 406 | 144 | — | 187 | 0.7674 |
| Amsco OMS | 352 | 386 | 125 | 27.0 | 184.5 | 0.7608 |
| Amsco 460 Solvent | 375 | 456 | 150 | 34.5 | 146.5 | 0.8108 |
| Amsco Odorless Insecticide Base | 375 | 482 | 152 | 26.5 | 175.0 | 0.7711 |

*Initial Boiling Point ASTM D-1078 and various others.

In some manufacturing processes the novel reaction products are added directly to a suitable carrier in a concentration sufficient to effect a bactericidal/fungicidal action, and in other manufacturing processes the reaction products may first be dissolved in a suitable Streptococcus sp.
Vibrio
Yeast In general, the mixed reaction products are effective as bactericides against aerobic and anaerobic bacteria and against facultative anerobes.

A major use of the mixed reaction products is as bactericides/fungicides in cutting oils, penetrating oils, grinding lubricants, iron tinning lubricants, core oils and hydraulic fluids. These oils, and particularly cutting oils, are employed in circulating systems, the oils being charged into the system and thereafter, desirably, not being replaced for a long period of time, for example, a year or more. Some of the bacteria and fungi above mentioned tend to degrade the oil over such an extended period of time rendering it less than fully effective for its intended purpose, for example, by breaking down the emulsion, inasmuch as cutting oils in addition to the basic oil that is employed also have present therein as a conventional matter a diluent such as water, a surfactant and a coupling agent, the cutting oil, as the term generically is employed, usually being an emulsion of oil-in-water. Moreover, some of the bacteria reduce sulfates present in the oil to form sulfides which give rise to objectionable odors that are particularly noticeable after the cutting oils have been permitted to stand idle over a holiday or weekend. Other bacteria degrade the oil itself and still other bacteria may attack the object being cut or the cutting tool. Heretofore when the cutting oil has degraded sufficiently, it has been usual to drain the system and charge in a new batch of cutting oil. This is relatively expensive; that is to say, more expensive than the addition of an effective amount of a bactericide/fungicide which is able to maintain a low concentration of bacteria and fungi, in other words low enough to prevent deterioration of the emulsion, the oil or the metal present.

Pursuant to the present invention, the mixed reaction products are added to the cutting oil in an amount such that they are effective to control bacteria and fungi, holding them below amounts that are commercially deleterious. A typical amount of the mixed reaction product is about 0.05% to about 0.2% by weight of the reaction product to the weight of the cutting oil emulsion.

The most desirable way of incorporating the novel bactericide/fungicide is to add the same to a cutting oil concentrate in an amount such that the finally diluted cutting oil will have the indicated concentration of the bactericide/fungicide. A typical cutting oil concentrate contains approximately 30% by weight of oil, surfactants and other addenda to which there is added the new bactericide/fungicide to form a base that is shipped to a customer. The customer then adds approximately 10 to 100 parts by weight of water to 1 part by weight of base, the preferred addition being 40 parts by weight of water.

The purpose of the present invention is not to formulate a new cutting oil concentrate or new cutting oil emulsion, exclusive of a bactericide/fungicide, but rather to use conventional cutting oil concentrates and conventional cutting oil emulsions in which there is present a mixed reaction product of the instant invention as a novel bactericide/fungicide. By way of example, typical oils present in the cutting oil base are mineral lubricating oils. Another suitable oil is a naphthene base distillate oil, and another a mixed paraffin-naphthene base distillate oil. Naphthene base distillate fractions are quite useful because of their better emulsification properties and stability. One specific oil is a mixture of refined base oil fractions having an SUS at 100° F between 70 and 800. Another proprietary cutting oil is sold by the Texas Company under the trade name Soluble Oil TL3337.

Typical surfactants, i.e. emulsifying agents, commonly used in conjunction with the oil in the cutting oil concentrate include soaps of petroleum sulfonic acids, naphthenic acids, fatty acids, rosin and tall oil, also oil-soluble metal petroleum sulfonates, alkali metal naphthanates and resinates, salts of fatty and carboxylic acids such as guanidine salts of high molecular weight, fatty acids and alkanolamine salts of carboxylic acids containing a least 10 carbon atoms, alkali metal salts of tall oil, Triton X100 and ethoxylated octyl phenol having 10 mols of ethyleneoxide. These soaps of salts usually are formed with sodium, but potassium also may be employed although it is somewhat more expensive. Mixtures of emulsifiers, for example, a mixture of sodium naphthanate and sodium petroleum sulfonate, a mixture of sodium resinate, sodium naphthanate and sodium petroleum sulfonate and a mixture of guanidine stearate and triethanolamine stearate are particularly useful. As indicated previously, such emulsifying agents are conventional addenda for cutting oils. It is usual to have a total emulsifier concentration of between about 10% and about 20% by weight of the cutting oil concentrate, exclusive of water, with concentrations between 12% and 16% ordinarily being employed.

Another addendum for the cutting oil concentrate is a coupling agent. These improve the texture and stability of the cutting oil concentrate and of the cutting oil emulsion formed therefrom upon the addition of water. Typical coupling agents include mono and polyhydroxy alcohols, ether-alcohols and phenols. Examples of these compounds include ethyl, isopropyl, n-propyl, isobutyl, n-butyl and n-amyl alcohols; ethylene glycol, diethylene glycol and propylene glycol; ethylene glycol alkyl ethers wherein the alkyl group has from 1 to 8 carbon atoms, for example ethylene glycol monoethylether (Cellosolve), ethylene glycol monoisopropylether, ethylene glycol monobutylether, ethylene glycol mono-n-pentylether, ethylene glycol mono-n-hexylether, diethylene glycol monoethylether (Carbitol), diethylene glycol monobutylether and cresol. The concentration of the coupling agent in the cutting oil concentrate, exclusive of water, usually is between about 0.1% and about 1.5% by weight. A particularly good coupling agent used in the cutting oil art is Cellosolve in a concentration of between about 0.6% and about 1% by weight of the cutting oil concentrate exclusive of the water.

Another conventional addendum is a rust inhibitor. Typical rust inhibitors are an amine, e.g. triethanolamine, and sodium nitrite. The quantity of the amine employed ranges up to 5%, and of the sodium nitrite up to 10%. Such inhibitors are useful where the cutting oil is used on ferrous products and usually is omitted where the cutting oil is used on non-ferrous products.

Where specific situations require other addenda, the same also may be employed inasmuch as the novel mixed reaction products of this invention are inert to addenda employed in this field and, indeed, inert to all the carriers mentioned herein.

Another use of the novel mixed reaction products of the instant invention is as a bactericide/fungicide in hydraulic fluids. A preferred amount of said mixed reaction products in a hydraulic fluid is about 0.5% by weight of the fluid. An effective range is from about 0.75% by weight to about 1% by weight of the hydraulic fluid. Inasmuch as the constitutions of hydraulic fluids are well known and form the subject of many patents and publications, it merely will be mentioned here that a typical hydraulic fluid includes a mineral oil and surfactants, a typical surfactant being a petroleum sulfonate. Examples of petroleum sulfonates useful for this purpose are the Petronates and Di-Petronates made by Sonneborn Division of Witco Chemical Company, Inc., and the Petrosuls manufactured by Pennsylvania Refining Co. Typical such petroleum sulfonates are Petronate L, Petronate HL, Petronate K, Petronate CR, Di-Petronate L, Di-Petronate HL, Di-Petronate K, Petronate CR, Petrosul 742, Petrosul 745, Petrosul 454, Petrosul 750, Petrosul 550 and Petrosul 744LC. Also useful as surfactants in hydraulic fluids are the emulsifying agents mentioned above in connection with cutting oil emulsions. The hydraulic fluids also usually include water, the mix being about 60% by weight of the oil and emulsifying agent and about 40% by weight of water. The emulsion is of the water-in-oil type. It will be appreciated that the foregoing is simply by way of example. Many hydraulic fluids do not include natural oils but are formulated from synthetic lubricants. Frequently, and particularly in the case of low temperature usages, these fluids are anhydrous.

Another use of the novel mixed reaction products of the present invention is as a bactericide/fungicide in a household disinfectant or cleaner. Here, too, a typical disinfectant or cleaner formulation may be employed, except for omission of the bactericidal and/or fungicidal agent, along with an effective amount of the novel mixed reaction products, the effective amount being for use as a bactericide/fungicide. A useful amount is about 0.5% by weight of said mixed reaction products in the disinfectant or cleaner. The balance of the disinfectant or cleaner will consist of water and the usual addenda. For example, in this balance there may be, depending upon the use to which the disinfectant or cleaner is to be put, about 100% of a surfactant-detergent such as an alkyl aryl sulfonate; one such excellent sulfonate is one where the alkyl moiety has from 12 carbon atoms and the aryl moiety is benzene. Lower amounts of the mixed reaction products can be employed effectively, for example, as little as 0.1% by weight of the total disinfectant or cleaner although it is preferred to have at least 0.2% by weight. Considerably more than 0.5% by weight may be employed although more is not ordinarily necessary to obtain the desired bactericidal/fungicidal effect. However, it has been observed that 3% by weight of the mixed reaction products is not irritating on patch tests so that such a high concentration and even a concentration as high as about 5% by weight can be employed although, as just pointed out, it is not desirable to use the same purely on an economic basis since a lower concentration is effective for the desired purpose.

Other suitable surfactants are a non-ionic surfactant which can be employed in an amount of about 2% by weight, a typical such surfactant being Tergitol 15S-12 which is a synthetic secondary alcohol containing 15 carbon atoms and 12 mols of ethyleneoxide. An alternative surfactant is a cationic surfactant, a satisfactory amount being in the range of 3% by weight. A typical such surfactant which is acceptable is a quaternarized polyethoxy tallow amine commercially known as Ethameen T-25, this being quaternarized with diethyl sulfate.

In addition to the foregoing, other conventional addenda may be employed in the cleaner, for instance, a thickener such, for example, as 2% by weight of alkanolamide or cocoa diethanolamide. As heretofore, in connection with the household disinfectant or cleaner, the specific constitution thereof is conventional except for the use therein of the novel mixed reaction products of this invention as a bactericide/fungicide.

Still another use to which the mixed reaction products of the present invention can be employed as a bactericide/fungicide is in connection with soaps, ether liquid or solid. An example thereof is a conventional bar soap with up to 3% by weight of the mixed reaction products incorporated therein prior to the formation of the bars. It will be appreciated that the same mixed reaction products can be used with other types of soaps such, for instance, as soap flakes, soap beads, liquid soaps and liquid soap concentrates.

The said bactericides/fungicides desirably can be employed in diluted form, e.g. in water, ethanol or propanol, employed in diluted form, e.g. in water, ethanol or propanol, in a 0.5% concentration, for entire body washing when it is desired to disinfect the skin for any reason, e.g. prior to surgical operations. In this and other uses, if desired, a higher concentration of the mixed reaction products can be used, e.g. as much as 30% by weight based on the carrier.

Another use to which the novel mixed reaction products of the instant invention can be put is as an inhibitor of mold growth for paints, where from about 0.1% to about 5% by weight can be used by incorporating the same into otherwise conventional paints as a fungicide. Typical paints into which the novel mixed reaction products can be incorporated are water-base emulsion paints such as acrylic paints, vinyl paints, latex paints and alkyd paints, all being of the water emulsion type, and oil-base paints such, for instance, as linseed oil paint.

It is pointed out that the novel mixed reaction products of the present invention can be safely used in these many compositions of matter because they are not toxic either when applied to the skin or ingested in small amounts, For example, the LD-50 of a 4% water solution of preferred mixed reaction product is less than 1 gram per kilogram of body weight when orally ingested by rats. In view of the fact that the mixed reaction products of this invention are used in low concentrations as indicated above, the amount of any one of the compositions of matter in which the mixed reaction products have been incorporated that would have to be swallowed for adverse side effects from said reaction products to ensue would have to be so large as to be incapable, as a practical matter, of ingestion due to the very large amount of the carrier that would have to be swallowed and, indeed, it is unlikely that an adult or child would be able to retain an amount of carrier, without regurgitation, which contains an undesirable amount of the reaction product.

The following results were noted in connection with tests performed with the preferred mixed reaction product (hereinafter PMRP).

| BACTERIOSTATIC AND FUNGISTATIC TESTS | |
|---|---|
| Method: | Agar Cup Plate, U. S. Department of Agriculture, Circular #198, 1931. |
| Organisms: | 1. *Pseudomonas aeruginosa* (PRD-10). |
| | 2. *Aspergillus niger.* |
| | 3. *Fusarium.* |

BACTERIOSTATIC AND FUNGISTATIC TESTS

| Media: | 1. F. D. A. agar. |
| --- | --- |
| | 2. Sabouraud's agar. |
| | 3. Sabouraud's agar. |
| Dilution: | 0.1% PMRP in water. |
| Incubation: | 1. 37° C – 48 hours, |
| | 2 & 3. Room temperature (25° C) one week. |

| Results: | Organism | Average Zone of Inhibition in mm |
| --- | --- | --- |
| | Pseudomonas aeruginosa (PRD-10) | 6.0 |
| | Aspergillus niger | 2.5 |
| | Fusarium | 2.5 |

On white albino rats tested with 10% by weight PMRP in corn oil, the $LD_{50}$ for acute oral toxicity was about 0.7g. PMRP/kilogram of body weight.

On white albino rabbits tested with 100% by weight of PMRP, the $LD_{50}$ for acute dermal toxicity was about 2g. PMRP/kilogram of body weight.

On white albino rabbits tested for eye irritation, there was no irritation (3.7/110) for 0.1% PMRP/cc water; no irritation (12.3/110) for 4% PMRP/cc water; and irritation (45.7/110) for undiluted PMRP.

On white albino rabbits tested for skin irritation, there was no irritation (0.4/8.0) for 0.1% PMRP/cc water; no irritation (1.0/8.0) for 4% PMRP/cc water; and no irritation (4.2/8.0) for undiluted PMRP.

On white albino rats tested with 4% by weight PMRP in water, the $LD_{50}$ for acute oral toxicity was about 6.8g. PMRP/kilogram of body weight. General signs of intoxication exhibited by the rats following dosing included hypoactivity, ruffed fur, muscular weakness, labored breathing, cyanosis, and prostration. Necropsy examination of the animals that died revealed hemorrhages in the gastrointestinal tracts. No gross pathologic alterations were noted among the animals sacrificed at the end of the 14-day observation period.

An acute vapor inhalation toxicity study was conducted with PMRP wherein a group of ten albino rats was exposed to vapor of the test material for four hours in a 70-liter chamber. The average nominal vapor concentration was 0.6 mg/l air. Following exposure, the rats were observed for a period of 14 days.

No deaths or adverse body weight effects were noted during exposure or the two-week observation period. Clear nasal discharge was observed in all rats during exposure, but this reaction subsided within 18 hours after removal from the test atmosphere. Necropsy did not reveal any gross pathologic alterations.

On rainbow trout (Salmo gairdnerii) tested with PMRP for toxicity, the four-day $TL_{50}$ was 74 ppm., the four-day $TL_1$ was 122 ppm. and the four-day $TL_{99}$ was 44 ppm. On bluegill sunfish (Lepomis macrochirus) tested for toxicity, the four-day $TL_{50}$ was 40 ppm., the four-day $TL_1$ was 69 ppm. and the four-day $TL_{99}$ was 23 ppm. These compare to a four-day $TL_{50}$ of about 0.019 ppm. of Toxaphene for the rainbow trout and a four-day $TL_{50}$ of about 0.016 ppm. of Toxaphene for the bluegills.

On bobwhite quail in an eight day dietary study the LC-hd 50 for PMRP was in excess of 5,000 ppm. This is in contrast to an $LC_{50}$ of 23.5 ppm. for dieldrin.

0.1% PMRP in water was innoculated into a sample having a count of 180,000,000/ml. organisms (predominantly pseudomonas) and into a sample of a coolant (an emulsion of oil-in-water where the oil was a mixture of sulferized and chlorinated vegetable animal oils) having a count of 280,000,000/ml. Like organisms. Both samples were incubated at 37° C for one month. Transfers were made into nutrient broth at one hour, daily for the first week and semi-weekly for the rest of the period. No growth was obtained at any of the time intervals.

Similar tests were carried out on the first sample with 0.05% PMRP in water. Growth was obtained immediately after innoculation but not thereafter.

A test was carried out with 0.1% PMRP in water on a sample having a count of 320,000,000/ml. like organisms. The sample was incubated at 37° C for three weeks. Transfers were made into nutrient broth immediately after innoculation, at one day, and at one, two and three weeks thereafter. Growth was obtained immediately after innoculation but not thereafter.

A test similar to the last was carried out with the same results on a sample contaminated with 600,000,000/ml. like organisms.

A test similar to the last was carried out with the same results on a sample contaminated with 1,000/ml. like organisms and with a fungus belonging to the genus fusaria. The transfers were into nutrient broths for bacteria and into Sabourand's agar for the presence of molds.

A test was carried out with 0.1% PMRP in water on a sample contaminated with a fungus showing the presence of bacillus subtilis and a fungus belonging to the genus fusaria. Transfers were made immediately after innoculation, then again at one day, and at one, two and three weeks thereafter. Transfers were made into nutrient broth for the presence of bacteria and into Sabourand's agar for the presence of molds. Growth was obtained for both bacteria and fungi from immediate transfers. No bacterial growth was obtained after one day or thereafter. Fungal growth was obtained after the one day transfer but not after the one, two and three week transfers.

Tests were carried out with a sample contaminated with 48,000 organisms/g. that on staining yielded a Gram negative rod (possibly an aerobacter), 5,000 fusarii/g. and a 45,000 yeast count. The sample was plated onto both tryptone glucose yeast extract agar for bacteria counts and Sabouraud's agar for mold and yeast dentaminatious. The samples were innoculated with 0.1% PMRP in water and incubated at 37° C for 3 weeks. Transfers were made immediately after innoculation, at 1 day, at 2 days and at 1, 2, and 3 weeks thereafter, at which time the sample was rechallenged with the contaminated sample and transfers were made immediately thereafter and at 5 days. Growth was obtained immediately after innoculation and at one day but not thereafter. Growth was also obtained immediately after challenging but not thereafter.

It thus will be seen that there are provided novel mixed reaction products, compositions and methods which achieve the various objects of the invention and which are well adapted to meet the conditions of practical use.

As various possible embodiments might be made of the above invention, and as various changes might be made in the embodiments above set forth, it is to be understood that all matter herein described is to be interpreted as illustrative and not in a limiting sense.

Having thus described the invention there is claimed as new and desired to be secured by Letters Patent:

1. A bactericide and fungicide composition constituting a mixture of 1,3, 5 variegated and non-variegated trialkanol triazines of the formula

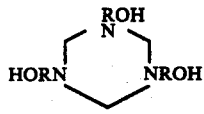

wherein each R is an alkyl moiety having from 1 to 4 carbon atoms, formed by mixing two or more monoalkanolamines having 1 to 4 carbon atoms and reacting said mixture with a stoichiometric amount of paraformaldehyde at a temperature of between 75° to 110° C under vacuum until the water produced by the reaction is substantially removed, and each of the said monoalkanolamines being present for the reaction in an amount of at least 5% by weight of the total weight of all the monoalkanolamines.

2. A composition as set forth in claim 1 wherein only two monoalkanolamines are reacted with paraformaldehyde.

3. A composition as set forth in claim 2 wherein the ratio of monoalkanolamines is from one-half to two gram mols of either to from two to one-half gram mols of the other.

4. A composition as set forth in claim 1 wherein the monoalkanolamines reacted with paraformaldehyde are monoethanolamine and 1-isopropanolamine.

5. A composition as set forth in claim 4 wherein the monoalkanolamines are present in equimolar proportions.

* * * * *